United States Patent
Karaoguz et al.

(10) Patent No.: US 8,842,545 B2
(45) Date of Patent: Sep. 23, 2014

(54) ENERGY BASED COMMUNICATION PATH SELECTION

(75) Inventors: Jeyhan Karaoguz, Irvine, CA (US); Nambirajan Seshadri, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/614,023

(22) Filed: Sep. 13, 2012

(65) Prior Publication Data

US 2013/0003717 A1   Jan. 3, 2013

Related U.S. Application Data

(63) Continuation of application No. 11/092,193, filed on Mar. 29, 2005, now Pat. No. 8,315,212.

(60) Provisional application No. 60/601,455, filed on Aug. 13, 2004.

(51) Int. Cl.
*H04J 1/16* (2006.01)
*H04W 40/08* (2009.01)

(52) U.S. Cl.
CPC .............. *H04W 40/08* (2013.01); *Y02B 60/50* (2013.01); *Y02B 60/42* (2013.01)
USPC .......................................... 370/238; 370/252

(58) Field of Classification Search
USPC .......................................... 370/498, 238, 252
See application file for complete search history.

(56) References Cited

U.S. PATENT DOCUMENTS

| | | | |
|---|---|---|---|
| 6,771,700 B1 | 8/2004 | Razoumov et al. | |
| 7,415,548 B2 | 8/2008 | Mahany et al. | |
| 2002/0071395 A1* | 6/2002 | Redi et al. | 370/252 |
| 2002/0161913 A1* | 10/2002 | Gonzalez et al. | 709/233 |
| 2002/0193146 A1 | 12/2002 | Wallace et al. | |
| 2003/0028668 A1 | 2/2003 | Garcia-Luna-Aceves et al. | |
| 2003/0053522 A1* | 3/2003 | Hayoun et al. | 375/147 |
| 2004/0017843 A1 | 1/2004 | Fitton et al. | |
| 2004/0116146 A1 | 6/2004 | Sadowsky et al. | |
| 2004/0213218 A1 | 10/2004 | Dougherty et al. | |
| 2005/0181813 A1 | 8/2005 | Zou | |

* cited by examiner

*Primary Examiner* — Sai-Ming Chan
(74) *Attorney, Agent, or Firm* — Brinks Gilson & Lione (57) ABSTRACT

A system and method for determining an information communication path based on energy requirements. Various aspects of the present invention provide a method that comprises identifying a plurality of information communication paths that may be utilized to communicate information (e.g., one or more units of information). A communication path identification module may perform such identification. Respective amounts of energy to communicate the information may be estimated for at least a portion of the identified plurality of information communication paths. A communication energy estimation module may perform such estimation. An information communication path may be selected from the identified plurality of information communication paths based, at least in part, on the estimated respective amounts of energy. A communication path selection module may perform such selection.

20 Claims, 3 Drawing Sheets

Figure 3

ENERGY BASED COMMUNICATION PATH SELECTION

CROSS REFERENCE TO RELATED APPLICATIONS

This patent application is a continuation of U.S. application Ser. No. 11/092,193 filed Mar. 29, 2005, and entitled "ENERGY BASED COMMUNICATION PATH SELECTION," which is related to and claims priority from provisional patent application Ser. No. 60/601,455 filed Aug. 13, 2004, and entitled "ENERGY BASED COMMUNICATION PATH SELECTION," the contents of each of which are hereby incorporated herein by reference in their entirety. This patent application is related to U.S. patent application Ser. No. 11/093,157 filed Mar. 29, 2005 and entitled "ENERGY BASED INFORMATION TRANSFER METHODOLOGY."

BACKGROUND

Various communication systems provide for information communication over respective communication paths. For example and without limitation, characteristics of various information communication paths may comprise various specific communication networks or combinations thereof (e.g., company LAN, Internet, home PAN, etc.), various communication network types (e.g., telecommunication, computer, television, etc.), various communication media (e.g., wired, wireless, tethered optical, non-tethered optical), various communication infrastructure, various signal propagation paths, etc.

Communicating information over various communication paths may correspond to utilizing varying respective amounts of energy. Such energy may, for example, be utilized directly for information transmission or in related signal processing activities. In an exemplary scenario, two information communication paths may correspond to transmitting information at identical transmission power levels, but may correspond to utilizing substantially different amounts of energy for communicating information. Overall energy consumption corresponding to a communication path may depend on any of a variety of factors, including but not limited to, transmission power, data rate, signal processing amount, signal processing speed, total amount of data, quality goals, communication environment characteristics, data retransmission activity, etc.

Various communication systems have relatively finite energy supplies. For example, various communication systems may receive operational energy from batteries. Such communication systems may also have static or dynamic communication quality constraints. In various scenarios, energy utilization and communication quality may be adversely related.

DETAILED DESCRIPTION

Figure 1:
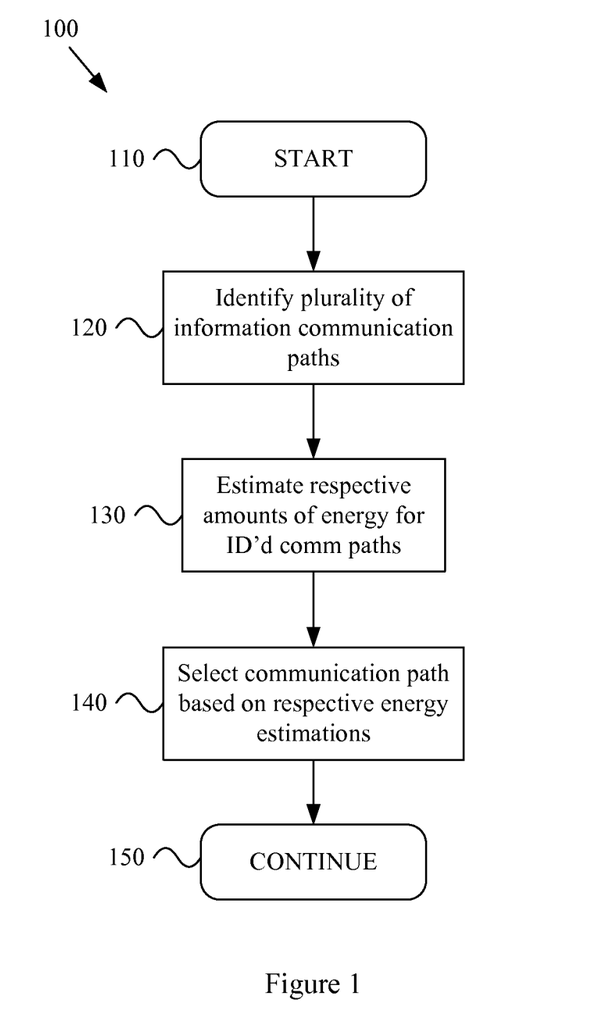
FIG. 1 shows a flow diagram of an exemplary method for determining an information communication path, in accordance with various aspects of the present invention.

FIG. 1 shows a flow diagram of an exemplary method 100 for determining an information communication path, in accordance with various aspects of the present invention. The exemplary method 100 may, for example, be implemented in any of a variety of communication systems. For example and without limitation, such a communication system may comprise characteristics of a portable or stationary communication system. Such a communication system may, for example, receive electrical energy from a relatively finite energy source (e.g., a battery) or a relatively infinite energy source (e.g., from a wall outlet). Such a communication system may, for example, comprise characteristics of a cellular phone, personal digital assistant, pager, portable television, pocket computer, portable computer, etc. Such a communication system may communicate any of a variety of information types (e.g., audio information, video information, data information, general multi-media information, etc.). Accordingly, the scope of various aspects of the present invention should not be limited by characteristics of any particular communication system that may implement the exemplary method 100, or any method or functionality discussed herein.

The exemplary method 100 may begin at step 110. The exemplary method 100 may begin for any of a large variety of reasons. For example and without limitation, the method 100 may begin in response to a command to begin, for example originating at a user or other system. Also for example, the method 100 may begin automatically upon system start-up, power-up or reset. Additionally, the method 100 may begin upon receipt of an indication that a communication is to occur (e.g., an outgoing communication or an incoming communication). Further for example, the method 100 may begin in response to a detected operating condition (e.g., a power supply condition, communication link condition, etc.). Accordingly, the scope of various aspects of the present invention should not be limited by characteristics of any particular initiating cause or condition.

The exemplary method 100 may, at step 120, comprise identifying a plurality of information communication paths that may be utilized to communicate information with one or more other communication systems.

Such information may, for example, comprise one or more units of information, where a "unit of information" is generally a quantifiable amount of information. For example and without limitation, a unit of information may be a packet, data frame, message, song, program, music video, movie, etc. Further for example, a unit of information may be a quantifiable portion (e.g., a timed segment, known or estimated amount of data, etc.) of a non-quantifiable amount of information (e.g., a television channel or telephone conversation). Such information may comprise characteristics of any of a variety of types of information (e.g., textual, graphical, multi-media, video, audio, pictorial, general data, etc.). The scope of various aspects of the present invention should not be limited by characteristics of a particular type of information or by any arbitrary notion of what a unit of such information may comprise.

An information communication path may generally be defined as a route that information (or data) travels from one communication system to one or more other communication systems. An information communication path may comprise any of a variety of communication path characteristics. For example and without limitation, an information communication path may comprise a direct link between communication systems or may comprise one or more intervening communication networks between communication systems.

For example, a first communication path of the plurality of information communication paths may comprise a first communication network, and a second communication path of the plurality of information communication paths may comprise a second communication network in place of at least a portion of the first communication network. In a non-limiting exemplary scenario, a first communication path of the plurality of information communication paths may comprise a telecommunication network, and a second communication path of the plurality of information communication paths may comprise a computer communication network in place of at least a portion of the telecommunication network. In the non-limiting exemplary scenario, the first communication path may comprise utilizing a telecommunication network to provide the entire communication path between first and second communication systems, and the second communication path may utilize a computer network to communicate between the first communication system and a central switch of the telecommunication network and utilize the telecommunication network to communicate information between the central switch and the second communication system.

Also for example, a first communication path of the plurality of information communication paths may comprise a satellite communication network, and a second communication path of the plurality of information communication paths may comprise a terrestrial communication network in place of at least a portion of the satellite communication network. In a non-limiting exemplary scenario, the first communication path may comprise a satellite communication network that communicates data between North America and Europe, and the second communication path may comprise a transatlantic telecommunication cable that communicates data between North America and Europe instead of utilizing the satellite communication network. In a second non-limiting exemplary scenario, the first communication path may comprise a satellite communication network that communicates data between Chicago and Los Angeles, and the second communication path may comprise an Internet link between Chicago and Los Angeles in place of the satellite communication network.

Further for example, a first communication path of the plurality of information communication paths may comprise a relatively wide area network, and a second communication path of the plurality of information communication paths may comprise a relatively local area network in place of at least a portion of the relatively wide area network. In a non-limiting exemplary scenario, the first communication path may comprise a local area network (LAN), and the second communication path may comprise a personal area network (PAN) in place of at least a portion of the LAN. Additionally for example, a first communication path of the plurality of information communication paths may comprise a personal area network, while a second communication path of the plurality of information communication paths does not comprise the personal area network.

In another example, a first communication path of the plurality of information communication paths may comprise a first communication path through a first communication network, and a second communication path of the plurality of information communication paths may comprise a second communication path through the first communication network in place of at least a portion of the first communication path. In a non-limiting exemplary scenario, the first communication path may comprise channeling data through a first set of intermediate Internet nodes, and the second communication path may comprise channeling data through a second set of intermediate Internet nodes in place of the first set of intermediate Internet nodes. In another non-limiting exemplary scenario, the first communication path may comprise communicatively coupling with a LAN through a first access point, and the second communication path may comprise communicatively coupling with the LAN through a second access point. In yet another non-limiting exemplary scenario, the first communication path may comprise communicatively coupling with a cellular telephone network through a first cellular base station, and the second communication path may comprise communicatively coupling with the cellular telephone network through a second cellular base station in place of the first cellular base station.

Still further for example, a first communication path of the plurality of information communication paths may comprise a connectionless communication path (e.g., a path or set of paths through which data packets may flow) and a second communication path of the plurality of information communication paths may comprise a connection-oriented communication path (e.g., a communication path having an dedicated timeslot, channel or code) in place of at least a portion of the connectionless communication path. In a non-limiting exemplary scenario, the first communication path may comprise an array of paths between communicating systems through which a message that is divided into a plurality of data packets may flow, and the second communication path may comprise a single dedicated path through which a message that is divided into a plurality of data frames may consistently flow.

Also for example, a first communication path of the plurality of information communication paths may comprise a first set of communication multipaths, and a second communication path of the plurality of information communication paths may comprise a second set of communication multipaths in place of at least a portion of the first set of communication multipaths. In a non-limiting exemplary scenario, the first communication path may comprise a first set of two of four possible multipaths (e.g., which may be associated with respective MIMO antennas in a communication system) for communicating information, and the second communication path may comprise a different set of the four multipaths in place of the first set of multipaths. In another non-limiting exemplary scenario, the first communication path may comprise one of four possible multipaths, and the second communication path may comprise all four multipaths in place of the one multipath. In yet another non-limiting scenario, the first communication path may comprise a wireless path corresponding to a plurality of antennas utilized in a beamforming configuration, and the second communication path may comprise a plurality of wireless paths corresponding to the plurality of antennas utilized in a MIMO configuration.

Additionally for example, a first communication path of the plurality of information communication paths may comprise a first communication medium, and a second communication path of the plurality of information communication paths may comprise a second communication medium in place of at least a portion of the first communication medium. In a non-limiting exemplary scenario, the first communication path may comprise a wireless communication path, and the second communication path may comprise an optical communication path in place of at least a portion of the wireless communication path. In another non-limiting exemplary scenario, the first communication path may comprise a wireless communication path between a first and second communication node, and the second communication path may comprise a path between the first and second communication node that comprises a first portion that is wired and a second portion that is wireless.

In general, the information communication paths may comprise any of a large number of communication path characteristics. The previous exemplary illustrations represent a non-limiting example of various communication path characteristics. Accordingly, the scope of various aspects of the present invention should not be limited by characteristics of particular information communication paths.

As mentioned previously, the exemplary method 100 may, at step 120, comprise identifying a plurality of information communication paths that may be utilized to communicate information between a system implementing the method 100 and one or more other communication systems. Step 120 may comprise identifying the plurality of information communication paths in any of a variety of manners.

Such communication path identification may, for example, comprise determining respective communication capabilities of communicating systems. Such communication capabilities may, for example, comprise any of a large variety of communication capability characteristics. For example and without limitation, such communication capabilities may comprise capabilities to communicate utilizing various communication networks, media, protocols, modulation types, encoding types, compression schemes, etc.

Step 120 may, for example and without limitation, comprise identifying communication capabilities by communicating with a database that includes information related to the communication capabilities of various systems. Step 120 may also, for example, comprise identifying communication capabilities by establishing a communication link with the various communication systems and communicating information of such capabilities with the various systems. Step 120 may then, for example, comprise identifying a plurality of potential information communication paths based, at least in part, on the determined communication capabilities of the communicating systems.

In a non-limiting exemplary scenario, step 120 may comprise determining that the various communication systems are capable of communicating by utilizing a cellular telephone network link with a single antenna or MIMO, an IEEE 802.11-based wireless link, a satellite link and the Internet.

Step 120 may also, for example, comprise determining information communication paths by identifying communication networks that may be utilized to communicatively couple the communication system implementing the method 100 to the other communication systems. Step 120 may then, for example, comprise identifying the plurality of information communication paths based, at least in part, on the identified networks.

Continuing the non-limiting exemplary scenario, step 120 may comprise determining that the cellular telephone network (non-MIMO), an 802.11-based connection and the Internet are available for communicating between the various systems, but not the satellite link and the MIMO cellular telephone network. Also, step 120 may comprise, based on the information of communication capabilities and available networks, identifying the plurality of information communication paths by matching communication system capabilities with available communication network characteristics.

After identifying communication paths, step 120 may, for example and without limitation, comprise testing the identified communication paths to determine which communication paths will work. Such testing may, for example, comprise communicating polling or other test messages.

Further for example and without limitation, step 120 may comprise identifying a plurality of information communication paths that may be utilized to communicate information by identifying communication networks to which the various communication systems are already coupled. In a non-limiting exemplary scenario, the various communication systems may be communicatively coupled (at least in a stand-by mode) to a variety of respective communication networks. In the exemplary scenario, step 120 may comprise determining that the various communication systems are already coupled (at least in a stand-by mode) to respective cellular telephone networks, cable television networks, personal area networks and the Internet.

In general, step 120 may comprise identifying a plurality of information communication paths that may be utilized to communicate information with at least one other communication system. Accordingly, the scope of various aspects of the present invention should not be limited by characteristics of any particular manner of identifying a plurality of information communication paths.

The exemplary method 100 may, at step 130, comprise estimating respective amounts of energy to communicate the information (e.g., one or more units of the information) for at least a portion of the identified plurality of information communication paths. Step 130 may comprise estimating respective amounts of energy in any of a variety of manners. Note that the following discussion may generally distinguish between electrical power and electrical energy, which may generally be viewed as power integrated over an amount of time, over an amount of information, over an amount of signal processing activity, etc.

For example and without limitation, step 130 may comprise estimating respective amounts of energy for at least a portion of the identified plurality of information communication paths based, at least in part, on transmission power. Step 130 may, for example, comprise integrating such power over a time period, unit of information, known or estimated amount of data, etc. For example, various information communication paths may correspond to utilizing a transmitter to transmit information, where the transmitter utilizes a non-negligible amount of electrical power to transmit the information. Additionally, various information communication paths may correspond to transmitting information at different power levels and/or transmitting a particular amount of information over different durations.

In a non-limiting exemplary scenario, a first information communication path may correspond to transmitting data at an output power of 2.5 Watts (e.g., utilizing a cellular telecommunication link), and a second information communication path (e.g., utilizing an 802.11 link) may correspond to transmitting data at an output power of 1 Watt. In a second exemplary scenario, a first information communication path may correspond to transmitting information at a variable output power of approximately 2 Watts (e.g., to a relatively distant station), and a second information communication path may correspond to transmitting information at a relatively constant 0.2 Watts (e.g., to a relatively close communication network node).

Note that step 130 may, in various scenarios, also comprise estimating respective amounts of energy for at least a portion of the identified plurality of information communication paths based at least in part on corresponding reception power. For example, in various scenarios, different communication paths may correspond to utilizing different respective amounts of electrical power in signal reception circuitry. For example, a first information communication path (e.g., a path in which the signal being received is relatively strong) may comprise utilizing a relatively low amount of electrical power in a receiver, and a second information communication path (e.g., a path in which the signal being received is relatively weak and requires a large degree of amplification) may comprise utilizing a relatively high amount of electrical power.

Also for example, step 130 may comprise estimating respective amounts of energy for at least a portion of the identified plurality of information communication paths based at least in part on signal processing energy (or power). For example, different communication paths may correspond to different respective amounts of signal processing and/or different respective rates of signal processing, which may correspond to different amounts of electrical energy. In an exemplary scenario, a first information communication path (e.g., a video communication path that utilizes no compression) may comprise utilizing a relatively low amount of electrical energy to perform signal processing, and a second information communication path (e.g., a video communication path that communicates compressed video information) may comprise utilizing a relatively high amount of electrical energy to perform signal processing. In another exemplary scenario, a first information communication path (e.g., a path for non-real-time messaging requiring relatively low-rate signal processing) may correspond to utilizing a relatively low amount of electrical power for signal processing, and a second information communication path (e.g., a path for real-time communications requiring relatively high-rate signal processing) may correspond to utilizing a relatively high amount of electrical power for signal processing.

Further for example, step 130 may comprise estimating respective amounts of energy for at least a portion of the identified plurality of information communication paths based at least in part on energy required to retransmit information (e.g., information not successfully communicated during a previous transmission). For example, various information communication paths may correspond to retransmitting different respective amounts of information. Such retransmission may consume a non-negligible amount of energy. For example, a first communication path may correspond to less reliable communication than a second communication path. Also for example, a first communication path may correspond to a relatively high-noise environment, and a second communication path may correspond to a relatively low-noise environment. Further for example, a first communication path may comprise different error detection/correction mechanisms than a second communication path.

Additionally for example, step 130 may comprise estimating respective amounts of energy for at least a portion of the identified plurality of information communication paths based, at least in part, on energy required to re-process retransmitted information. For example, as mentioned previously, various information communication paths may correspond to retransmitting at least a portion of transmitted information. Such retransmitted information may correspond to additional signal processing (e.g., at a transmitting system and/or receiving system). Such signal processing may, for example and without limitation, comprise re-encoding/decoding, re-compressing/decompressing, re-encrypting/decrypting, etc.

In general, step 130 may comprise estimating respective amounts of energy to communicate information for one or more of the plurality of information communication paths (e.g., as identified at step 120). Step 130 may, for example and without limitation, comprise estimating respective amounts of energy utilizing any one or combination of the above-mentioned energy considerations (e.g., transmission power, reception power, signal processing energy (or power), amount of data, data rate, encoding and decoding, encrypting and decrypting, compressing and decompressing, reprocessing and retransmitting, etc.). Further, since the above-mentioned energy considerations are merely exemplary, step 130 may comprise utilizing any other communication-related energy considerations that were not discussed previously. Accordingly, the scope of various aspects of the present invention should not be limited by characteristics of any particular manner of estimating energy that may be utilized to communicate information.

The exemplary method 100 may, at step 140, comprise selecting an information communication path (e.g., to utilize to communicate a unit of information) from the identified plurality of information communication paths (e.g., as identified at step 120) based, at least in part, on the estimated respective amounts of energy (e.g., as determined at step 130). Step 140 may comprise performing such selection in any of a variety of manners, non-limiting illustrative examples of which are provided below.

Step 140 may, for example, comprise selecting an information communication path by selecting an information communication path with the lowest respective estimated amount of energy. Various information communication paths may, for example, correspond to utilizing different respective amounts of energy to communicate information (e.g., one or more units of information). In an exemplary scenario, a first information communication path (e.g., a path corresponding to relatively slow, low quality communication) may correspond to utilizing a relatively low amount of energy, and a second information communication path (e.g., a path corresponding to real-time high-quality communication) may correspond to utilizing a relatively high amount of energy. In the exemplary scenario, if the first information communication path corresponds to generally acceptable non-energy-related characteristics (e.g., communication quality), step 140 may comprise selecting the first information communication path, which utilizes less energy than the second information communication path.

Also for example, step 140 may comprise selecting an information communication path by selecting an information communication path based, at least in part, on one or more communication quality goals. For example and without limitation, such communication quality goals may comprise characteristics related to information transfer speed (e.g., data rate), error rate, amount of noise, signal-to-noise ratio, general reliability, data accuracy, data resolution, data security, etc. Various quality goals may, for example, be static or may change depending on operating scenario. For example, a real-time communication system may comprise relatively stringent quality goals (e.g., data rate) during normal operation and comprise relatively loose quality goals (e.g., data rate) during power-save operation.

Step 140 may, for example, comprise determining such communication quality goals in any of a variety of manners. For example and without limitation, step 140 may comprise utilizing predetermined quality goals (e.g., stored in local memory or a system database). Also for example, step 140 may comprise communicating with other communication systems to determine quality goals. Further for example, step 140 may comprise communicating with a user to determine quality goals.

In an exemplary scenario, step 140 may comprise selecting an information communication path that corresponds to utilizing the least amount of energy while meeting minimum quality goals. In another exemplary scenario, step 140 may comprise determining an information communication path that corresponds to a desired balance between energy consumption and communication quality.

In general, step 140 may comprise selecting an information communication path based, at least in part, on one or more communication quality goals. Accordingly, the scope of various aspects of the present invention should not be limited by characteristics of a particular quality goal, manner of determining a quality goal, or manner of utilizing a quality goal to select an information communication path.

Further for example, step 140 may comprise selecting an information communication path based, at least in part, on one or more user commands. Such a user command may, for example, be stored in memory or acquired from a user in real-time. In an exemplary scenario, step 140 may comprise accessing stored information communication path preference information (e.g., a prioritized list) and selecting an information communication path based, at least in part, on such preference information. In another exemplary scenario, step 140 may comprise presenting a list of information communication path options or a list of the identified information communication paths to a user, soliciting input from the user, and selecting an information communication path based, at least in part, on the user input.

In general, step 140 may comprise selecting an information communication path based, at least in part, on one or more user commands. Accordingly, the scope of various aspects of the present invention should not be limited by characteristics of a particular user command, manner of acquiring or determining a user command, or manner of utilizing a user command to select an information communication path.

Step 140 may also, for example, comprise selecting an information communication path to utilize to communicate information based, at least in part, on communication environment conditions. Such communication environment conditions may, for example and without limitation, comprise present amount of network traffic, available communication bandwidth, noise, weather effects, network operational status, generally communication network constraints, etc.

For example and without limitation, step 120 may have identified a particular information communication path as being available, but the particular information communication path may correspond to communicating information through a communication environment that is presently experiencing difficulties (e.g., failures or high noise). Step 140 may comprise determining such communication environment conditions, for example, by communicating test information through the communication environment, communicating information regarding the communication environment with a database or central controller, or listening to other entities communicating in the communication environment.

Also for example, step 140 may comprise selecting an information communication path based, at least in part, on operating mode of various communication systems. For example, various communication systems may be operating in relatively high performance, low performance, power-save and/or sleep modes. Step 140 may, for example, comprise determining operating mode information corresponding to various communication systems and utilizing such information to select an information communication path. In a non-limiting exemplary scenario, step 140 may comprise determining that a communication system with which communication is desired is presently operating in a low power, stand-by or sleep mode. In such an exemplary scenario, utilizing a real-time connection-oriented communication path may be unnecessarily wasteful of energy or other resources. Thus, in the exemplary scenario, step 140 may comprise selecting a relatively low-data rate connectionless communication path, which is relatively energy-efficient.

Further for example, step 140 may comprise selecting an information communication path based, at least in part, on operating cost (e.g., monetary cost). For example, various information communication paths may correspond to utilizing communication resources having respective monetary costs. In an exemplary scenario, a first information communication path (e.g., corresponding to utilization of a connectionless communication protocol and associated communication resources) may correspond to a relatively low operating cost, and a second information communication path (e.g., corresponding to utilizing a connection-oriented communication protocol with guaranteed communication bandwidth and associated communication resources) may correspond to a relatively high operating cost. In another exemplary scenario, a first information communication path (e.g., corresponding to communication of non-compressed video information) may correspond to a relatively high operating cost (e.g., due to increased bandwidth needs), and a second information communication path (e.g., corresponding to communicating compressed video information) may correspond to a relatively low operating cost.

Still further for example, step 140 may comprise selecting an information communication path based, at least in part, on power supply (or energy supply) characteristics. Such power supply characteristics may comprise power supply characteristics associated with one or more communicating systems. For example and without limitation, power supply characteristics may comprise information regarding communication system power (or energy) availability. In an exemplary scenario, a first information communication path may correspond to utilizing a relatively low amount of energy to provide relatively low quality communications, and a second information communication path may correspond to utilizing a relatively large amount of energy to provide relatively high quality communications. In an exemplary scenario, where under normal power supply conditions the second information communication path may be selected, step 140 may comprise selecting the first information communication path due to a relatively low amount of energy available to one of the communicating systems. Note that step 140 may comprise selecting an information communication path based on power supply characteristics of a system implementing the exemplary method 100 or another system.

Also for example, step 140 may comprise selecting an information communication path based, at least in part, on the type of information being communicated. For example and without limitation, various types of information may comprise audio information, video information, multi-media information, textual information, graphical information, pictorial information, data information, etc. Various types of information may correspond to different respective communication needs (e.g., quality goals).

In an exemplary scenario, a first information communication path may be capable of communicating any information, and a second information communication path may comprise features particularly designed to communicate textual information. Step 140 may, in the exemplary scenario, comprise selecting the second information communication path to communicate a text message. In another exemplary scenario, a first information communication path may be capable of communicating video information at high resolution and relatively high energy usage, and a second information communication path may be capable of communicating video information only at low resolution and relatively low energy usage. Step 140 may, in the exemplary scenario, select the second information communication path due to a relatively low priority associated with video information communication.

As mentioned previously, step 140 may, for example, comprise determining various selection criteria by communicating with other systems. Step 140 may also, for example, comprise selecting an information communication path based, at least in part, on negotiations between various communicating systems. Various communicating systems may have respective operating requirements and conditions.

In an exemplary scenario, a first information communication path may normally be the path of choice, but a second communicating system may have severely limited energy resources. In the exemplary scenario, step 140 may comprise selecting a second information communication path due to the needs of the second communication system. In another exemplary scenario, a first information communication path may be preferable for a higher priority communication system, and a second information communication path may be preferable for a lower priority communication system. Step 140 may, in the exemplary scenario, comprise selecting the first information communication path because of the preference of the higher priority system. In yet another exemplary scenario, a first information communication path may be preferable for a communication system implementing the method 100, and a second information communication path may be preferable for another system. Step 140 may, in the exemplary scenario, comprise selecting a third communication path as a compromise between preferences of the communication systems.

In general, step 140 may comprise selecting an information communication path (e.g., of those determined at step 120) to utilize to communicate information (e.g., one or more units of information) based, at least in part, on estimated respective amounts of energy (e.g., as determined at step 130) associated with one or more of the information communication paths. The previous examples are merely illustrative and, by no means, represent an exclusive set of examples. Accordingly, the scope of various aspects of the present invention should not be limited by characteristics of particular energy-based communication path selection techniques.

The exemplary method 100 may, at step 150, comprise performing continued processing. Step 150 may comprise performing any of a large variety of continued processing. For example and without limitation, step 150 may comprise directing execution flow of the method 100 back to previous steps (e.g., step 120). Also for example, step 150 may comprise communicating information utilizing the information communication path selected at step 140. Further for example, step 150 may comprise interfacing with various communication systems (e.g., during communications) to determine whether a different communication path should be selected. Accordingly, the scope of various aspects of the present invention should not be limited by characteristics of particular continued processing.

The exemplary method 100 was illustrated and discussed to provide illustrative examples of generally broader aspects of the present invention. Accordingly, the scope of various aspects of the present invention should, by no means, be limited to characteristics of the exemplary method 100.

Figure 2:
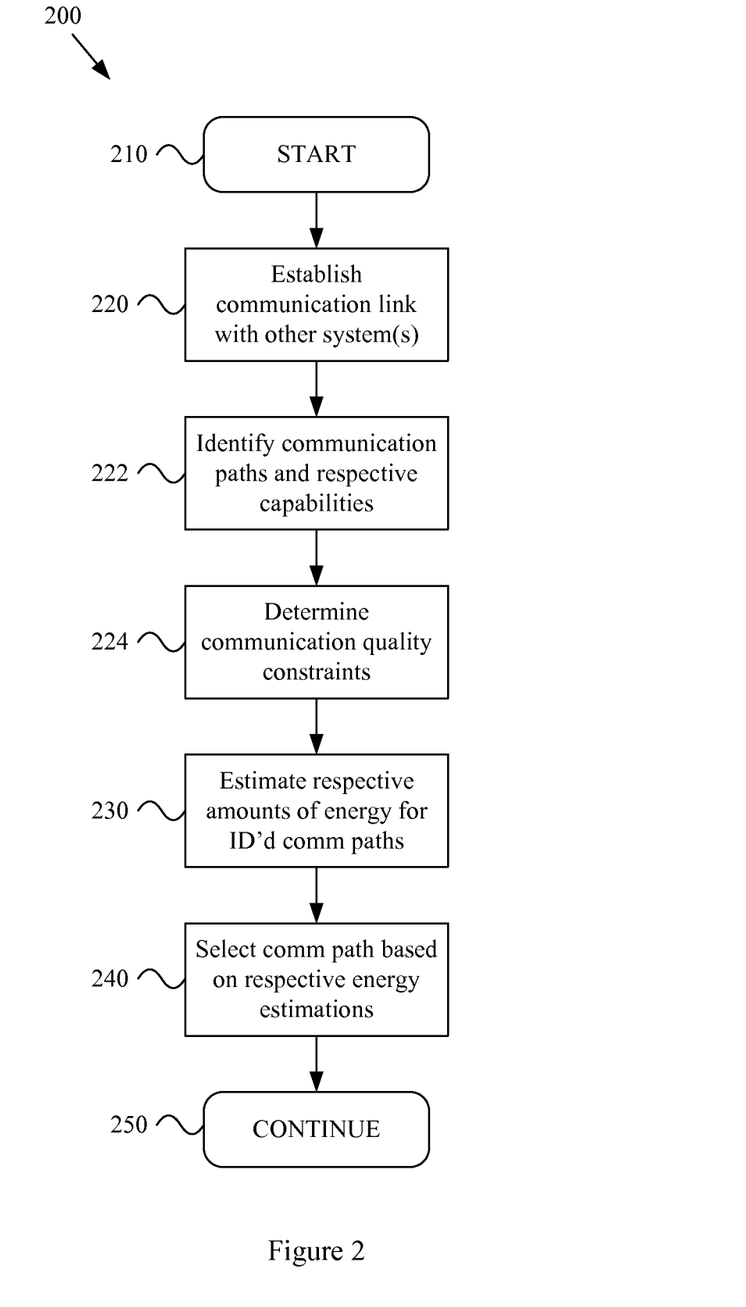
FIG. 2 shows a flow diagram of an exemplary method for determining an information communication path, in accordance with various aspects of the present invention.

FIG. 2 shows a flow diagram of an exemplary method 200 for determining an information communication path, in accordance with various aspects of the present invention. The exemplary method 200 may, for example and without limitation, share various characteristics with the exemplary method 100 illustrated in FIG. 1 and discussed previously. As with the exemplary method 100 illustrated in FIG. 1, the exemplary method 200 may, for example and without limitation, be implemented in a communication system (e.g., a portable communication system).

The exemplary method 200 may, at step 220, comprise establishing one or more communication links with one or more other systems. Such a communication link may comprise characteristics of any of a variety of communication links. For example, step 220 may comprise establishing the communication link utilizing any of a variety of communication media, protocols or networks. The scope of various aspects of the present invention should not be limited by characteristics of any particular communication link or manner of establishing a communication link.

The exemplary method 200 may, at step 222, comprise identifying information communication paths over which one or more other systems may communicate and/or identifying communication capabilities of the one or more other communication systems. Exemplary step 222 may, for example and without limitation, share various characteristics with step 120 of the exemplary method 100 illustrated in FIG. 1 and discussed previously.

For example, step 222 may comprise communicating with one or more communication systems to determine which information communication paths may be utilized for communication with such systems. Also for example, step 222 may comprise communicating with an information database to determine which information communication paths may be utilized for communication with various systems.

Step 222 may, for example, comprise communicating any of a variety of communication capability information. For example, such information may comprise information regarding communication networks, communication media, protocols, encoding/decoding capabilities, secure access capabilities, encryption/decryption capabilities, compression/decompression capabilities, data rate capabilities, various signal processing capabilities, etc.

Step 222 may, for example, comprise processing such information to determine a plurality of information communication paths that may be utilized to communicate information between various communication systems. Also for example, step 222 may comprise processing information related to the capabilities of the communication system(s) implementing the method 200. Characteristics of various information communication paths were generally discussed previously.

The exemplary method 200 may, at step 224, comprise determining communication quality constraints (e.g., quality goals and/or requirements). Such communication quality constraints were generally discussed previously. For example and without limitation, such communication quality constraints may comprise characteristics related to information transfer speed, error rate, amount of noise, general reliability, data accuracy, data resolution, data security, etc. Step 224 may, for example, comprise communicating information regarding quality constraints with other communication systems. Step 224 may also, for example, comprise communicating information regarding quality constraints with a database comprising such information.

The exemplary method 200 may, at step 230, comprise estimating respective amounts of energy for information communication paths (e.g., the information communication paths identified at step 222). Step 230 may, for example and without limitation, share various characteristics with step 130 of the exemplary method 100 illustrated in FIG. 1 and discussed previously.

The exemplary method 200 may, at step 240, comprise selecting an information communication path based, at least in part, on the energy estimations determined at step 230. Step 240 may also, for example, comprise selecting an information communication path based, at least in part, on the energy estimations determined at step 230 and the communication quality constraints determined at step 224. Step 240 may, for example and without limitation, share various characteristics with step 140 of the exemplary method 100 illustrated in FIG. 1 and discussed previously.

The exemplary method 200 was illustrated and discussed to provide non-limiting illustrative examples of generally broader aspects of the present invention. Accordingly, the scope of various aspects of the present invention should, by no means, be limited by characteristics of the exemplary method 200.

Figure 3:
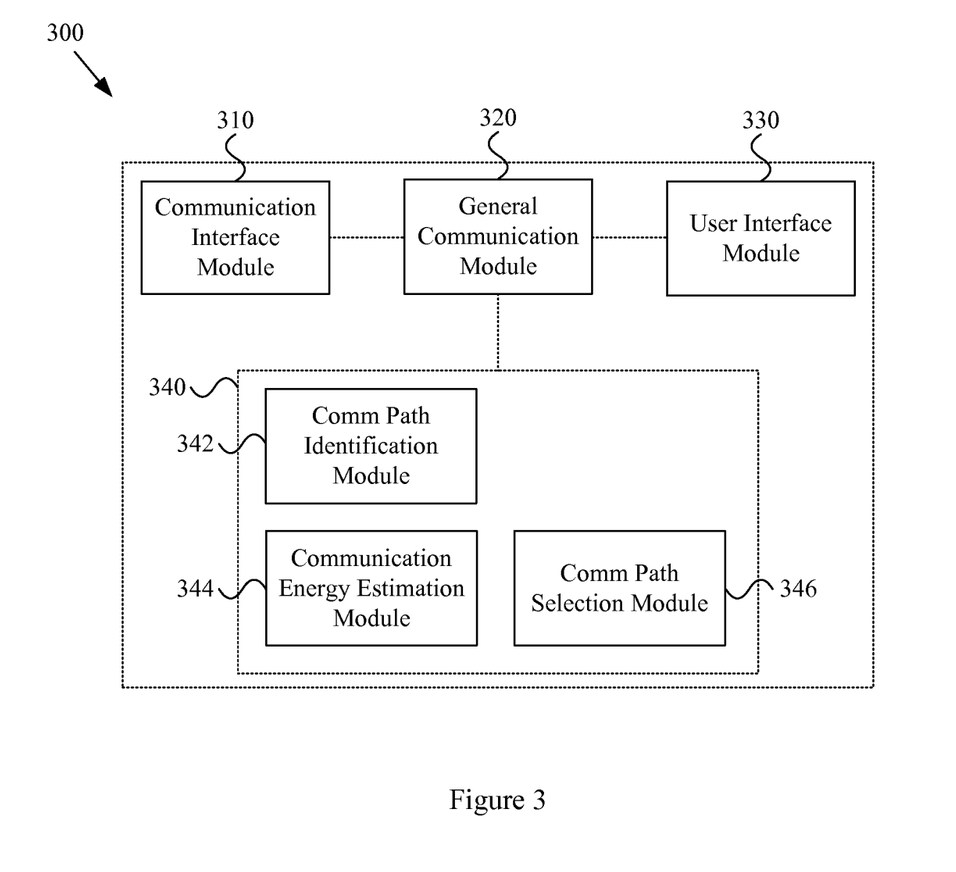
FIG. 3 is a drawing showing a block diagram of an exemplary communication system for determining an information communication path, in accordance with various aspects of the present invention.

FIG. 3 is a drawing showing a block diagram of an exemplary communication system 300 for determining an information communication path, in accordance with various aspects of the present invention. For example and without limitation, the functionality performed by components of the exemplary communication system 300 may share various characteristics with the exemplary methods 100, 200 illustrated in FIGS. 1-2 and discussed previously.

The exemplary communication system 300 may comprise a communication interface module 310. The communication interface module 310 may comprise characteristics of any of a variety of communication interfaces. For example, the communication interface module 310 may be adapted (i.e., comprise hardware and/or software) to communicate over any of a variety of communication networks (e.g., telecommunication, computer, television, satellite, terrestrial, etc.). Also for example, the communication interface module 310 may be adapted to communicate over any of a variety of communication media (e.g., wired, wireless RF, tethered optical, non-tethered optical, etc.). Also, the communication interface module 310 may be adapted to communicate utilizing any of a variety of communication standards and/or protocols. In addition, the communication interface module 310 may be adapted to communicate utilizing any of a variety of modulation types, encoding schemes, compression schemes, encryption schemes, secure access protocols, etc. Accordingly, the scope of various aspects of the present invention should not be limited by characteristics of any particular communication interface.

The exemplary communication system 300 may comprise a general communication module 320. The general communication module 320 may, for example, manage or support general communication activities performed by the communication system 300. In a non-limiting exemplary scenario where the communication system 300 comprises characteristics of a cellular phone, the general communication module 320 may perform various communication management or processing tasks associated with cellular telephony. In another non-limiting exemplary scenario where the communication system 300 comprises characteristics of an Internet communication system, the general communication module 320 may perform various communication management or processing tasks associated with Internet communications. In yet another non-limiting exemplary scenario where the communication system 300 comprises characteristics of a wireless PAN communication system, the general communication module 320 may perform various communication management or processing tasks associated with wireless PAN communications.

In general, the general communication module 320 may manage or support various aspects of communications, which may depend on the nature of the communication system 300. Accordingly, the scope of various aspects of the present invention should not be limited by characteristics of any particular general communications management or support hardware and/or software.

The exemplary communication system 300 may comprise a user interface module 330. The user interface module 330 may generally comprise hardware and/or software that provide an interface between a user and the communication system 300. The user interface module 330 may be adapted to provide any of large variety of user interface types (e.g., text-based, video-based, audio-based, touch-based, etc.). Accordingly, the scope of various aspects of the present invention should not be limited by characteristics of any particular user interface hardware and/or software.

The exemplary communication system 300 may comprise a system 340 that determines an information communication path. The exemplary system 340 may comprise a communication path identification module 342, a communication energy estimation module 344 and a communication path selection module 346.

The following discussion may generally refer to various modules. It must be recognized that the various modules may be implemented utilizing hardware, software or combinations thereof. Also, various modules may share components with various other modules. For example, a first module may share one or more hardware components (e.g., a processor, memory, etc.) with a second module. Also for example, a first module may share various software routines with a second module. Various modules may, for example, be integrated to any of a variety of degrees of integration. For example, various modules may be integrated into a single integrated circuit, separate integrated circuits on a board, or may be geographically collocated or geographically distributed. Accordingly, the scope of various aspects of the present invention should not be limited by characteristics of any particular hardware and/or software implementation of a module or any arbitrary boundary between modules.

The communication path identification module 342 ("CPI module 342") may identify a plurality of information communication paths that may be utilized to communicate information (e.g., one or more units of information) with one or more other communication systems. The CPI module 342 may, for example and without limitation, share various functional characteristics with step 120 of the exemplary method 100 illustrated in FIG. 1 and discussed previously.

As discussed previously with regard to FIG. 1, an information communication path may generally be defined as a route that information (or data) travels between one communication system and one or more other communication systems. An information communication path may comprise any of a large variety of information communication path characteristics. For example and without limitation, a communication path may comprise a direct link between communication systems or may comprise one or more intervening communication networks between communication systems.

For example, a first communication path of the plurality of information communication paths may comprise a first communication network, and a second communication path of the plurality of information communication paths may comprise a second communication network in place of at least a portion of the first communication network. Also for example, a first communication path of the plurality of information communication paths may comprise a satellite communication network, and a second communication path of the plurality of information communication paths may comprise a terrestrial communication network in place of at least a portion of the satellite communication network.

Further for example, a first communication path of the plurality of information communication paths may comprise a relatively wide area network, and a second communication path of the plurality of information communication paths may comprise a relatively local area network in place of at least a portion of the relatively wide area network. Additionally for example, a first communication path of the plurality of information communication paths may comprise a personal area network, while a second communication path of the plurality of information communication paths does not comprise the personal area network.

In another example, a first communication path of the plurality of information communication paths may comprise a first communication path through a first communication network, and a second communication path of the plurality of information communication paths may comprise a second communication path through the first communication network in place of at least a portion of the first communication path. Still further for example, a first communication path of the plurality of information communication paths may comprise a connectionless communication path (e.g., a path or set of paths through which data packets may flow) and a second communication path of the plurality of information communication paths may comprise a connection-oriented communication path (e.g., a communication path having an dedicated timeslot, channel or code) in place of at least a portion of the connectionless communication path.

Also for example, a first communication path of the plurality of information communication paths may comprise a first set of communication multipaths, and a second communication path of the plurality of information communication paths may comprise a second set of communication multipaths in place of at least a portion of the first set of communication multipaths. Additionally for example, a first communication path of the plurality of information communication paths may comprise a first communication medium, and a second communication path of the plurality of information communication paths may comprise a second communication medium in place of at least a portion of the first communication medium.

In general, the information communication paths may comprise any of a large number of communication path characteristics. The previous exemplary illustrations represent a non-limiting example of various communication path characteristics. Accordingly, the scope of various aspects of the present invention should not be limited by characteristics of particular information communication paths.

As mentioned previously, the communication path identification module 342 ("CPI module 342") may identify a plurality of information communication paths that may be utilized to communicate information (e.g., one or more units of information) with one or more other communication systems. The CPI module 342 may identify a plurality of information communication paths in any of a variety of manners.

In identifying various communication paths, the CPI module 342 may, for example and without limitation, determine respective communication capabilities of communicating systems. Such communication capabilities may, for example, comprise any of a large variety of communication capability characteristics. For example and without limitation, such communication capabilities may comprise capabilities to communicate utilizing various communication networks, media, protocols, modulation types, encoding types, compression schemes, etc.

The CPI module 342 may, for example, identify communication capabilities by communicating (e.g., utilizing the communication interface module 310) with a database that includes information related to the communication capabilities of various systems. The CPI module 342 may, for example, identify communication capabilities by establishing a communication link with the various communication systems and communicating information of such capabilities with the various systems. The CPI module 342 may then, for example, identify a plurality of information communication paths based, at least in part, on the determined communication capabilities of the communicating systems.

In a non-limiting exemplary scenario, the CPI module 342 may determine that the various communication systems are capable of communicating by utilizing a cellular telephone network link with a single antenna or MIMO, an IEEE 802.11-based wireless link, a satellite link and the Internet.

The CPI module 342 may also, for example, determine information communication paths by identifying communication networks that may be utilized to communicatively couple the communication system 300 to the other communication system(s). The CPI module 342 may then, for example, identify the plurality of information communication paths based, at least in part, on the identified networks.

Continuing the non-limiting exemplary scenario, the CPI module 342 may determine that the cellular telephone network (non-MIMO), 802.11-based connection and the Internet are available for communicating between the various systems, but not the satellite link and the MIMO cellular telephone network. Also, the CPI module 342 may, based on the information of communication capabilities and available networks, identify the plurality of information communication paths by matching communication system capabilities with available communication network characteristics.

After identifying communication paths, the CPI module 342 may, for example and without limitation, test the identified communication paths to determine which communication paths will work. Such testing may, for example, comprise communicating polling or other test messages between the communication system 300 and other communication systems.

Further for example and without limitation, the CPI module 342 may identify a plurality of information communication paths that may be utilized to communicate information by identifying communication networks to which the communication system 300 and one or more other communication systems are already communicatively coupled. In a non-limiting exemplary scenario, the various communication systems may be communicatively coupled (at least in a stand-by mode) to a variety of respective communication networks. In the exemplary scenario, the CPI module 342 may determine that the various communication systems are already communicatively coupled (at least in a stand-by mode) to respective cellular telephone networks, cable television networks, personal area networks and the Internet.

In general, the CPI module 342 may identify the plurality of information communication paths in any of a variety of manners. Accordingly, the scope of various aspects of the present invention should not be limited by characteristics of any particular manner of identifying a plurality of information communication paths or any particular hardware or software that may perform such identification.

The communication energy estimation module 344 ("CEE module 344") may estimate respective amounts of energy for a least a portion of a plurality of information communication paths (e.g., as identified by the CPI module 342). The CEE module 344 may, for example and without limitation, share various functional characteristics with step 130 of the exemplary method 100 illustrated in FIG. 1 and discussed previously. The CEE module 344 may estimate respective amounts of energy for various information communication paths in any of a variety of manners.

For example and without limitation, the CEE module 344 may estimate respective amounts of energy for at least a portion of the identified plurality of information communication paths based, at least in part, on transmission power. The CEE module 344 may, for example, integrate such power over a time period, unit of information, known or estimated amount of data, etc. For example, various information communication paths may correspond to utilizing a transmitter to transmit information, where the transmitter utilizes a non-negligible amount of electrical power to transmit the information. Additionally, various information communication paths may correspond to transmitting information at different power levels and/or transmitting a particular amount of information over different durations. The CEE module 344 may, in various scenarios, also estimate respective amounts of energy for at least a portion of the identified plurality of information communication paths based at least in part on reception power. For example, in various scenarios, different information communication paths may correspond to utilizing different respective amounts of electrical power in signal reception circuitry.

Also for example, the CEE module 344 may estimate respective amounts of energy for at least a portion of the identified plurality of information communication paths based, at least in part, on signal processing energy (or power). For example, different communication paths may correspond to different respective amounts of signal processing, which may correspond to different amounts of electrical energy. Further for example, the CEE module 344 may estimate respective amounts of energy for at least a portion of the identified plurality of information communication paths based, at least in part, on energy required to retransmit information. For example, various information communication paths may correspond to retransmitting different respective amounts of information.

Additionally for example, the CEE module 344 may estimate respective amounts of energy for at least a portion of the identified plurality of information communication paths based, at least in part, on energy required to re-process retransmitted information. For example, as mentioned previously, various information communication paths may correspond to retransmitting at least a portion of transmitted information. Such retransmitted information may correspond to additional signal processing (e.g., at the transmitting system and/or receiving system). Such signal processing may, for example and without limitation, comprise re-encoding/decoding, re-compressing/decompressing, re-encrypting/decrypting, etc.

The CEE module 344 may, for example and without limitation, estimate respective amounts of energy utilizing any one or combination of the above-mentioned energy considerations. Further, since the above-mentioned energy considerations are merely exemplary, the CEE module 344 may utilize any other communication-related energy considerations that were not discussed previously.

In general, the CEE module 344 may estimate respective amounts of energy to communicate information (e.g., one or more units of information) for at least a portion of the identified plurality of information communication paths (e.g., as identified by the CPI module 342). Accordingly, the scope of various aspects of the present invention should not be limited by characteristics of any particular manner of estimating energy that may be utilized to communicate information or by characteristics of any particular hardware and/or software for performing such energy estimation.

The communication path selection module 346 ("CPS module 346") may select an information communication path from a plurality of information communication paths (e.g., the communication paths identified by the CPI module 342) based, at least in part, on estimated respective amount of energy (e.g., as estimated by the CEE module 344). The CPS module 346 may, for example and without limitation, share various functional characteristics with step 140 of the exemplary method 100 illustrated in FIG. 1 and discussed previously. The CPS module 346 may select an information communication path in any of a variety of manners, non-limiting illustrative examples of which are provided below.

The CPS module 346 may, for example, select an information communication path by selecting an information communication path that corresponds to utilizing the lowest respective estimated amount of energy. Various information communication paths may, for example, correspond to utilizing different respective amounts of energy to communicate information (e.g., one or more units of information). In an exemplary scenario, a first information communication path (e.g., a path corresponding to relatively slow, low quality communication) may correspond to utilizing a relatively low amount of energy, and a second information communication path (e.g., a path corresponding to real-time high-quality communication) may correspond to utilizing a relatively high amount of energy. In the exemplary scenario, if the first information communication path corresponds to generally acceptable non-energy-related characteristics (e.g., communication quality), The CPS module 346 may select the first information communication path, which corresponds to utilizing less energy than the second information communication path.

Also for example, the CPS module 346 may select an information communication path by selecting an information communication path based, at least in part, on one or more communication quality goals. For example and without limitation, such communication quality goals may comprise characteristics related to information transfer speed (e.g., data rate), error rate, amount of noise, general reliability, data accuracy, data resolution, data security, etc. Various quality goals may, for example, be static or may change depending on operating scenario. For example, a real-time communication system may comprise relatively stringent quality goals (e.g., data rate) during normal operation and comprise relatively loose quality goals (e.g., data rate) during power-save operation.

The CPS module 346 may, for example, determine such communication quality goals in any of a variety of manners. For example and without limitation, the CPS module 346 may utilize predetermined quality goals (e.g., stored in local memory or a system database). Also for example, the CPS module 346 may communicate with other communication systems to determine quality goals. Further for example, the CPS module 346 may communicate with a user to determine quality goals.

In an exemplary scenario, the CPS module 346 may select an information communication path that corresponds to utilizing the least amount of energy while meeting minimum quality goals. In another exemplary scenario, the CPS module 346 may determine an information communication path that corresponds to a desired balance between energy consumption and communication quality.

In general, the CPS module 346 may select an information communication path based, at least in part, on one or more communication quality goals. Accordingly, the scope of various aspects of the present invention should not be limited by characteristics of a particular quality goal, manner of determining a quality goal, manner of utilizing a quality goal to select an information communication path, or related hardware and/or software.

Further for example, the CPS module 346 may select an information communication path based, at least in part, on one or more user commands. Such a user command may, for example, be stored in memory or acquired from a user in real-time. In an exemplary scenario, the CPS module 346 may access stored information communication path preference information (e.g., a prioritized list) and select an information communication path based, at least in part, on such preference information. In another exemplary scenario, the CPS module 346 may present a list of information communication path options or a list of the identified information communication paths to a user (e.g., utilizing the user interface module 330), solicit input from the user, and select an information communication path based, at least in part, on the user input.

In general, the CPS module 346 may select an information communication path based, at least in part, on one or more user commands. Accordingly, the scope of various aspects of the present invention should not be limited by characteristics of a particular user command, manner of acquiring or determining a user command, manner of utilizing a user command to select an information communication path, or related hardware and/or software.

The CPS module 346 may also, for example, select an information communication path to utilize to communicate information based, at least in part, on communication environment conditions. Such communication environment conditions may, for example and without limitation, comprise present amount of network traffic, available communication bandwidth, noise, weather effects, network operational status, generally communication network constraints, etc.

For example and without limitation, the CPI module 342 may have identified a particular information communication path as being available, but the particular information communication path may correspond to communicating information through a communication environment that is presently experiencing difficulties (e.g., failures or high noise). The CPS module 346 may determine such communication environment conditions, for example, by communicating test information through the communication environment, communicating information regarding the communication environment with a database or central controller, or listening to other entities communicating in the communication environment.

Also for example, the CPI module 342 may select an information communication path based, at least in part, on operating mode of various communication systems. For example, various communication systems may be operating in relatively high performance, low performance, power-save and/or sleep modes. The CPS module 346 may, for example, determine operating mode information corresponding to various communication systems and utilize such information to select an information communication path. In a non-limiting exemplary scenario, the CPS module 346 may determine that a communication system with which communication is desired is presently operating in a low power, stand-by or sleep mode. In such an exemplary scenario, utilizing a real-time connection-oriented communication path may be unnecessarily wasteful of energy or other resources. Thus, in the exemplary scenario, the CPS module 346 may select a relatively low-data rate connectionless communication path, which is relatively energy-efficient.

Further for example, the CPS module 346 may select an information communication path based, at least in part, on operating cost (e.g., monetary cost). For example, various information communication paths may correspond to utilizing communication resources having respective monetary costs. In an exemplary scenario, a first information communication path (e.g., corresponding to utilization of a connectionless communication protocol and associated communication resources) may correspond to a relatively low operating cost, and a second information communication path (e.g., corresponding to utilizing a connection-oriented communication protocol with guaranteed communication bandwidth and associated communication resources) may correspond to a relatively high operating cost. In another exemplary scenario, a first information communication path (e.g., corresponding to communication of non-compressed video information) may correspond to a relatively high operating cost (e.g., due to increased bandwidth needs), and a second information communication path (e.g., corresponding to communicating compressed video information) may correspond to a relatively low operating cost.

Still further for example, the CPS module 346 may select an information communication path based, at least in part, on power supply (or energy supply) characteristics. Such power supply characteristics may comprise power supply characteristics associated with one or more communicating systems. For example and without limitation, power supply characteristics may comprise information regarding communication system power (or energy) availability. In an exemplary scenario, a first information communication path may correspond to utilizing a relatively low amount of energy to provide relatively low quality communications, and a second information communication path may correspond to utilizing a relatively large amount of energy to provide relatively high quality communications. In an exemplary scenario, where under normal power supply conditions the second information communication path may be selected, the CPS module 346 may select the first information communication path due to a relatively low amount of energy available to one of the communicating systems. Note that the CPS module 346 may select an information communication path based on power supply characteristics of the communication system 300 or one or more other communication systems.

Also for example, the CPS module 346 may select an information communication path based, at least in part, on the type of information being communicated. For example and without limitation, various types of information may comprise audio information, video information, multi-media information, textual information, graphical information, pictorial information, data information, etc. Various types of information may correspond to different respective communication needs (e.g., quality goals).

In an exemplary scenario, a first information communication path may be capable of communicating any information, and a second information communication path may comprise features particularly designed to communicate textual information. The CPS module 346 may, in the exemplary scenario, select the second information communication path to communicate a text message. In another exemplary scenario, a first information communication path may be capable of communicating video information at high resolution and relatively high energy usage, and a second information communication path may be capable of communicating video information at only low resolution and relatively low energy usage. The CPS module 346 may, in the exemplary scenario, select the second information communication path due to a relatively low priority associated with video information communication.

As mentioned previously, the CPS module 346 may, for example, determine various selection criteria by communicating with other systems (e.g., utilizing the communication interface module 310). The CPS module 346 may also, for example, select an information communication path based, at least in part, on negotiations between various communication systems. Various communicating systems may have respective operating requirements and conditions.

In an exemplary scenario, a first information communication path may normally be the path of choice, but a second communicating system may have severely limited energy resources. In the exemplary scenario, the CPS module 346 may select a second information communication path due to the needs of the second communication system. In another exemplary scenario, a first information communication path may be preferable for a higher priority communication system, and a second information communication path may be preferable for a lower priority communication system. The CPS module 346 may, in the exemplary scenario, select the first information communication path because of the preference of the higher priority system. In yet another exemplary scenario, a first information communication path may be preferable for the communication system 300, and a second information communication path may be preferable for another system. The CPS module 346 may, in the exemplary scenario, select a third communication path as a compromise between preferences of the communication systems.

In general, The CPS module 346 may select an information communication path (e.g., of a plurality of communication paths identified by the CPI module 342) to utilize to communicate information (e.g., one or more units of information) based, at least in part, on estimated respective amounts of energy (e.g., as determined by the CEE module 344) associated with one or more of the information communication paths. The previous examples are merely illustrative and, by no means, represent an exclusive set of examples. Accordingly, the scope of various aspects of the present invention should not be limited by characteristics of particular energy-based communication path selection techniques or by particular hardware and/or software for making such selection.

The exemplary system 300 was illustrated and discussed to provide illustrative examples of generally broader aspects of the present invention. Accordingly, the scope of various aspects of the present invention should, by no means, be limited to characteristics of the exemplary system 300.

As mentioned previously, and as stressed here again, in the exemplary system 300, the various modules may, for example, be implemented in hardware, software or a combination thereof. Further, the various modules may each comprise a set of discrete components, may each be independent integrated circuits, or may each be a portion of an integrated circuit. Still further, the various modules may be located at one geographical location or distributed between multiple geographical locations. By no means should the scope of various aspects of the present invention be limited by characteristics of particular implementations or locations of various modules.

It should be noted that the previously presented exemplary system 300 and methods 100, 200 were provided to show specific examples of generally broader aspects of the present invention. Accordingly, the scope of various aspects of the present invention should not be limited by characteristics of particular examples presented herein.

In summary, various aspects of the present invention provide a system and method for determining a communication path based on energy requirements. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A device comprising:
a communication interface; and
system circuitry in communication with the communication interface, the system circuitry configured to:
identify a first communication path capable of handling a communication, wherein the first communication path is associated with a first communication protocol;
identify a second communication path capable of handling the communication, wherein the second communication path is associated with a second communication protocol different from the first communication protocol;
determine a quality goal associated with performing the communication;
obtain a first energy estimate for performing the communication over the first communication path according to the first communication protocol;
obtain a second energy estimate for performing the communication over the second communication path according to the second communication protocol;
determine, depending on the first and second energy estimates, a selected communication path, from among the first and second communication paths, that meets the quality goal; and perform the communication through the communication interface across the selected communication path.

2. The device of claim 1, wherein the first and second energy estimates comprise signal processing energy for processing the communication according to the first and second communication protocol respectively.

3. The device of claim 1, wherein the first and second energy estimates comprise transmission energy for sending the communication according to the first and second communication protocol respectively.

4. The device of claim 1, wherein the first and second energy estimates comprise reception energy for receiving the communication according to the first and second communication protocol respectively.

5. The device of claim 2, wherein the signal processing energy comprises energy to encode the communication for the first and second communication protocol respectively.

6. The device of claim 1, wherein the quality goal comprises a power-saving goal applicable when a power saving mode is active.

7. The device of claim 1, wherein the system circuitry is configured to determine a communication path with a lowest energy estimate as the selected communication path.

8. A device comprising:
a communication interface; and
system circuitry in communication with the communication interface, the system circuitry configured to:
identify a first communication path capable of handling a communication;
identify a second communication path capable of handling the communication;
determine an energy requirement for a receiving communication system for receiving the communication through the first path or the second path;
obtain a first energy estimate for performing the communication over the first communication path;
obtain a second energy estimate for performing the communication over the second communication path;

determine, depending on the first and second energy estimates and the energy requirement for the receiving communication system, a selected communication path, from among the first and second communication paths; and perform the communication to the receiving communication system through the communication interface across the selected communication path.

9. The device of claim 8, wherein the first and second energy estimates comprise signal processing energy for preparing the communication for transmission.

10. The device of claim 8, wherein first and second energy estimates comprise transmission energy for transmitting the communication.

11. The device of claim 8, wherein the energy requirement of the receiving communication system comprises a first energy estimate for receiving over the first path and a second energy estimate for receiving over the second path.

12. The device of claim 8, wherein the system circuitry is further configured to:

determine transmission power availability for performing the communication; and wherein the system circuitry is configured to determine the selection communication path depending further on the transmission power availability.

13. The device of claim 8, wherein the system circuitry is further configured to:

determine that the receiving communication system has a limited energy supply; and account for the limited energy supply of the receiving communication system when determining the selected communication path.

14. A device comprising:

a communication interface;

a memory storing selection criterion that represents a preferred communication goal; and system circuitry in communication with the communication interface and the memory, the system circuitry configured to:

obtain a communication indication to perform a communication, and in response:

identify a first communication path capable of handling a communication;

identify a second communication path capable of handling the communication;

obtain a first energy estimate for encoding the communication for transmission over the first communication path;

obtain a second energy estimate for encoding the communication for transmission over the second communication path;

determine a selected communication path, from among the first and second communication paths, the selected communication path meeting the selection criteria and having the lower of the first and second energy estimate for encoding the communication; and perform the communication through the communication interface across the selected communication path.

15. The device of claim 14, wherein the selection criterion specifies selecting a communication path that meets a predetermined quality goal.

16. The device of claim 14, wherein the selection criterion specifies selecting a communication path with a signal-to-noise ratio (SNR) that exceeds a predetermined SNR threshold.

17. The device of claim 14, wherein the selection criterion specifies selecting a communication path with a reliability characteristic that exceeds a predetermined threshold.

18. The device of claim 14, wherein the selection criterion specifies selecting a communication path with an error rate below a predetermined error threshold.

19. The device of claim 14, wherein the selection criterion specifies selecting a communication path with a data-rate that exceeds a predetermined data-rate threshold.

20. The device of claim 14, wherein the selection criterion varies depending on a power operating mode of a transmitting system, a receiving system, or both.

* * * * *